J. P. HISE.
ADJUSTABLE RACK FOR WAGON BRAKES.
APPLICATION FILED JAN. 16, 1914.
1,117,572.
Patented Nov. 17, 1914.
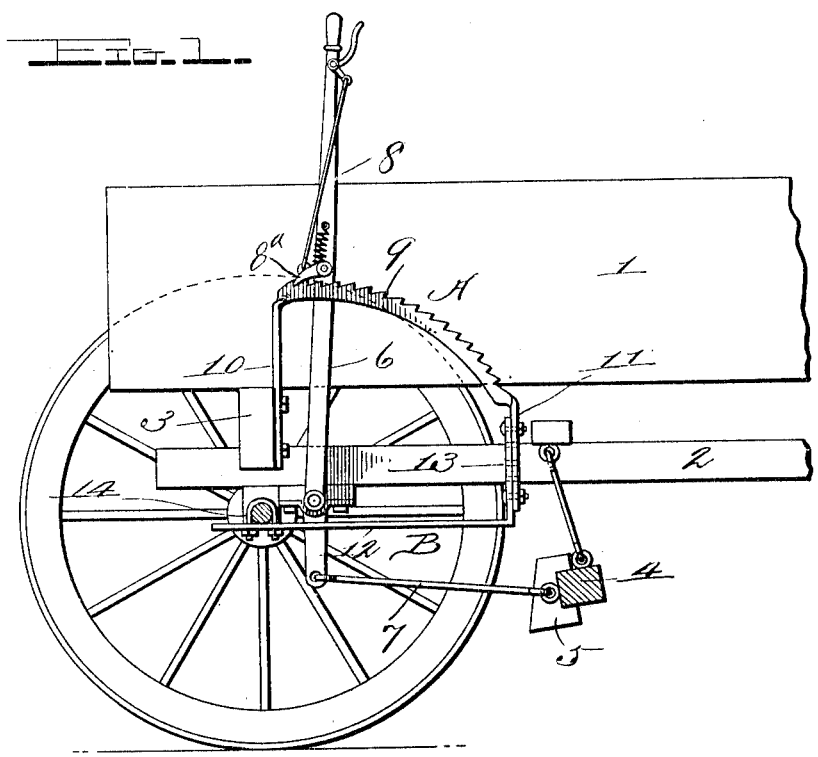
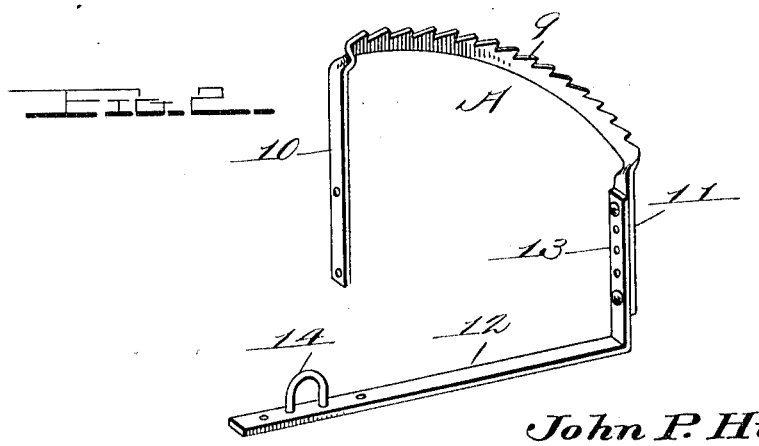
Witnesses
Chas. L. Griesbauer.
E. B. McBath
Inventor
John P. Hise,
By Chas E. Brock
Attorney

UNITED STATES PATENT OFFICE.

JOHN PAUL HISE, OF HIGHTOWN, VIRGINIA, ASSIGNOR TO THE HISE WAGON BRAKE COMPANY, OF MARLINTON, WEST VIRGINIA, A CORPORATION OF WEST VIRGINIA.

ADJUSTABLE RACK FOR WAGON-BRAKES.

1,117,572.  Specification of Letters Patent.  Patented Nov. 17, 1914.

Application filed January 16, 1914. Serial No. 812,482.

*To all whom it may concern:*

Be it known that I, JOHN P. HISE, a citizen of the United States, residing at Hightown, in the county of Highland and State of Virginia, have invented a new and useful Improvement in Adjustable Racks for Wagon-Brakes, of which the following is a specification.

This invention relates to an improvement in racks for brake levers. The object of the invention is to separate the rack entirely from the wagon bed supporting it from the rear bolster and axle, and a further object is to form the rack in two sections one of which is vertically adjustable so that the rack can be readily adapted and fitted upon wagons of different makes or sizes.

With these objects in view the invention consists of the novel features of construction hereinafter described, pointed out in the claims and shown in the accompanying drawings, in which:

Figure 1 is a side elevation, parts being shown in section. Fig. 2 is a detail perspective view of the rack detachable from the wagon.

In these drawings 1 represents the wagon bed, 2 the running gear, 3 the rear bolster, 4 the brake beam, 5 the brake shoe, 6 the brake lever and 7 the connecting rod between the brake beam and the lever. The lever 6 carries a hand grip 8 provided with a pawl 8ª, for engagement with the rack to be hereinafter described, said hand gripped device 8 upon manipulation lifting the pawl from engagement with the rack.

My rack is formed in two sections A and B, and the section A comprises a forwardly and downwardly curved rack portion 9 provided at its rear end with a vertically depending portion 10 adapted to be secured to the front face of the rear bolster. At its forward end the rack portion 9 carries a depending portion 11 parallel with the rear portion 10 and suitably perforated. The section B consists of a straight horizontal member 12 which at its front end carries an upright perforated member 13 adapted to rest against the rear face of the depending portion 11 and to be suitably secured thereto, the perforations in these engaging parts permitting considerable latitude in adjusting them when applying the rack to a wagon, this adjustment regulating the height of the curved portion 9 above the axle or above the brake beam 4. The horizontal member 12 is secured to the under side of the rear axle by means of a U-shaped clip 14 which fits over the axle and passes through suitable perforations upon the end portions of the clip.

What I claim is:—

1. A wagon rack formed in two sections, one section of which is secured to the rear bolster and the other to the wagon axle, said sections being also secured to each other, and one section being vertically adjustable with respect to the other.

2. A rack for brake levers formed in two sections, one of said sections comprising a curved rack portion, a depending rear member adapted to be secured to a rear bolster, and a forward depending member, the other section comprising a horizontal member having an upright front portion adapted to engage the second mentioned depending portion of the first section, and means for connecting the rear portion of said horizontal member to the rear axle.

3. A rack for wagon brakes formed in two sections, one of said sections comprising a curved rack portion, means for uniting said sections at their forward ends, the rear end of the section having the rack portion being adapted to bear against and be secured to the front face of the rear bolster, and the rear portion of the other section being adapted to rest beneath and be secured to a wagon axle.

JOHN PAUL HISE.

Witnesses:
 EDWIN B. JONES,
 J. H. PRUITT.

Copies of this patent may be obtained for five cents each, by addressing the "Commissioner of Patents, Washington, D. C."